Figure 1:
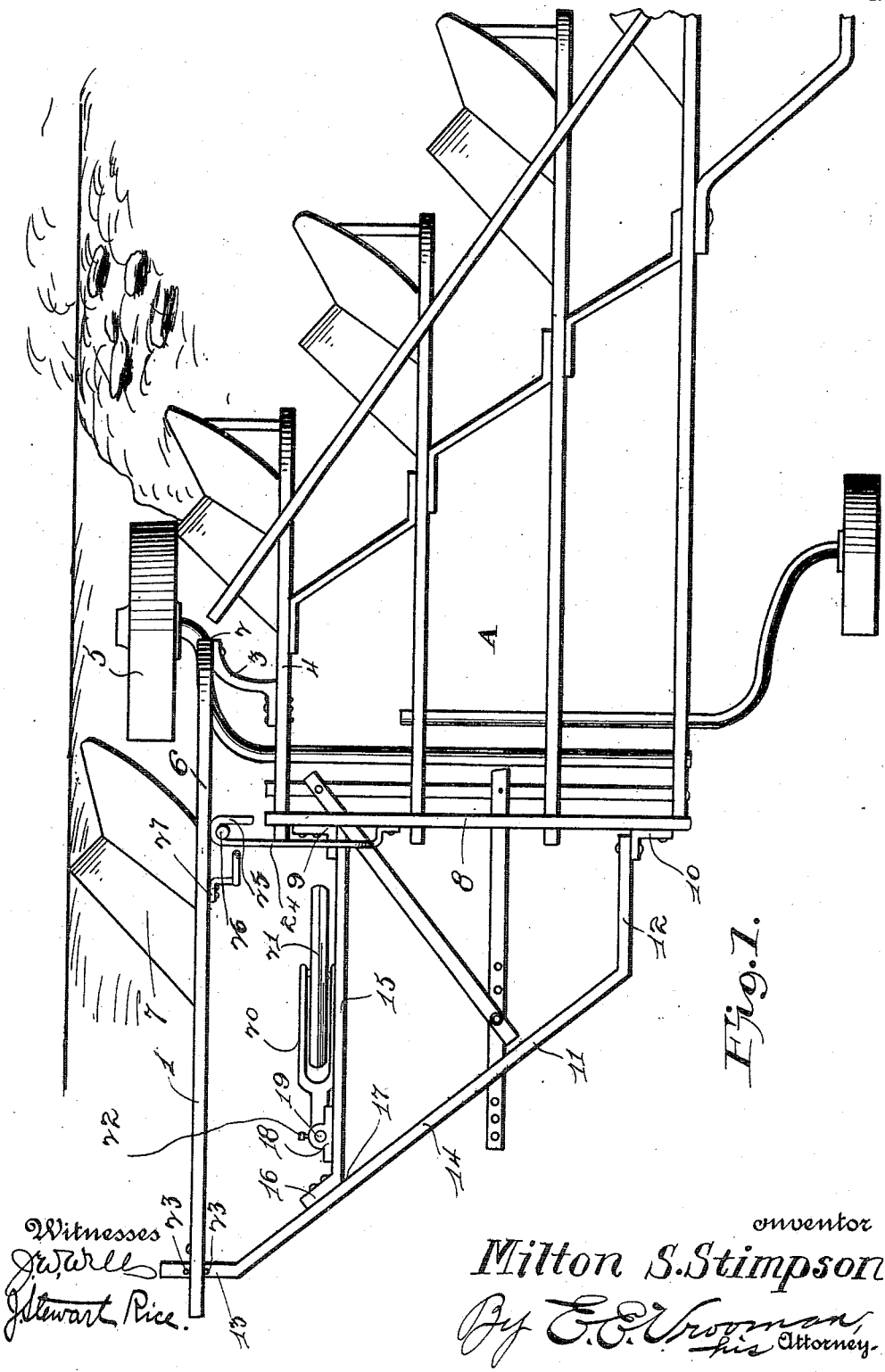

M. S. STIMPSON.
GANG PLOW ATTACHMENT.
APPLICATION FILED SEPT. 10, 1909.

973,145.

Patented Oct. 18, 1910.

2 SHEETS—SHEET 1.

Witnesses
Inventor
Milton S. Stimpson.
his Attorney.

M. S. STIMPSON.
GANG PLOW ATTACHMENT.
APPLICATION FILED SEPT. 10, 1909.
973,145.
Patented Oct. 18, 1910.
2 SHEETS—SHEET 2.
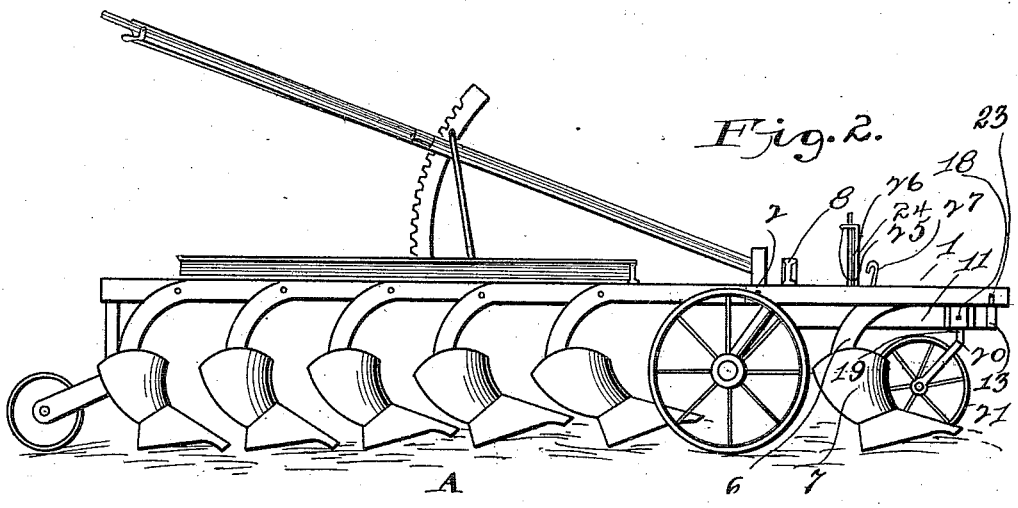
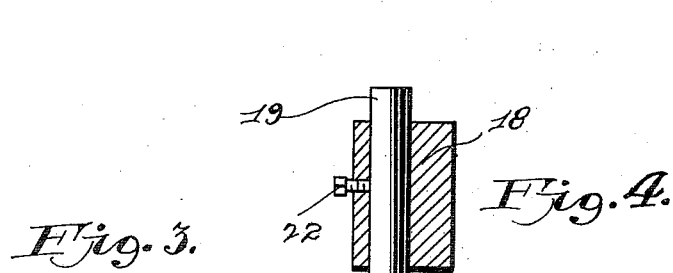
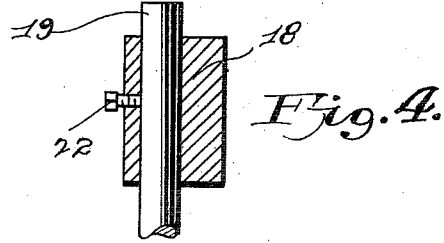
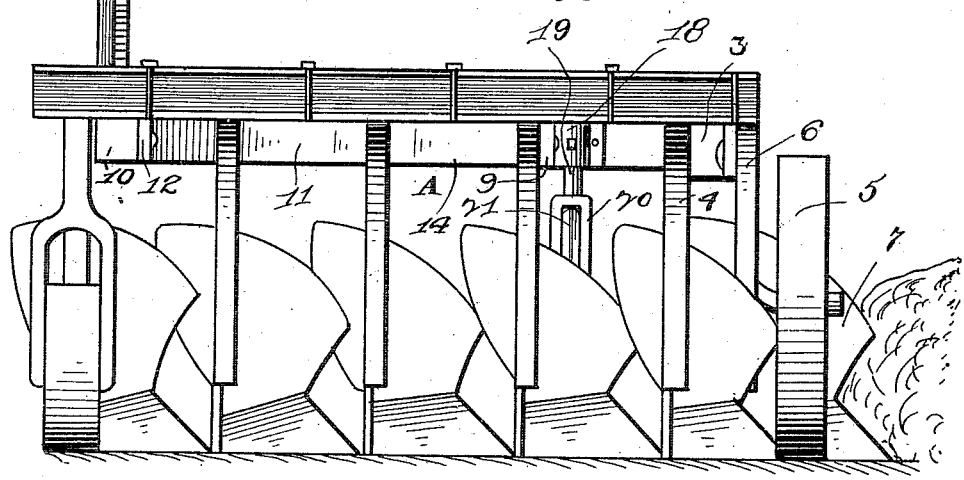
Witnesses
J. W. Wall
Stewart Rice
Inventor
Milton S. Stimpson.
By E. E. Vrooman,
his Attorney

UNITED STATES PATENT OFFICE.

MILTON S. STIMPSON, OF ROODHOUSE, ILLINOIS.

GANG-PLOW ATTACHMENT.

973,145.  Specification of Letters Patent.  Patented Oct. 18, 1910.

Application filed September 10, 1909. Serial No. 517,137.

*To all whom it may concern:*

Be it known that I, MILTON S. STIMPSON, a citizen of the United States of America, residing at Roodhouse, in the county of Greene and State of Illinois, have invented certain new and useful Improvements in Gang-Plow Attachments, of which the following is a specification, reference being had therein to the accompanying drawing.

My invention relates to improvements in attachments for plows, and has for its object to provide an attachment by which a gang plow can be made to do good plowing at times when the steering is not accurate.

As is well-known, when drawing a gang plow by means of a traction engine or other suitable means, the furrow-wheel often rides out of the furrow either on the land or plowed side thereby lifting some of the plowshares of the gang out or nearly out of the ground, and, hence, an area of very poor plowing follows until the furrow-wheel again enters the furrow.

Broadly, my invention consists in so mounting and arranging an auxiliary plowshare in front of the furrow-wheel of a plow that the furrow-wheel will run in the furrow or path of the auxiliary plowshare. Hence, it follows that when the plow is being properly or accurately steered, the auxiliary plow-share in front of the furrow-wheel will simply run idly through the furrow, but should the furrow-wheel be turned so as to leave the furrow being followed, then the auxiliary plowshare will cut a new furrow until the furrow-wheel is guided back into the furrow being followed. From this arrangement, it will be evident that satisfactory plowing will be accomplished at all times.

Other objects and advantages of my invention will appear in the course of the following specification.

In the accompanying drawings:—Figure 1 is a top plan view of a gang plow with my attachment connected thereto, a portion of said gang plow being broken off. Fig. 2 is a side elevation of the same. Fig. 3 is a rear elevation of Fig. 2. Fig. 4 is a partly sectional view of the means employed to adjust the position of the attachment on its supporting wheel.

Referring to the drawings, which illustrate the preferred embodiment of my invention, 1 designates a longitudinally forwardly-extending beam, which is suitably pivoted at 2 to a curved arm 3 secured to the beam 4 of the plowshare next to the furrow-wheel 5 of a gang plow A. Suitably supported from or mounted on the beam 1 is a depending standard 6 carrying an auxiliary plowshare 7, which is positioned in front of the furrow-wheel 5. The plowshare 7 is designed to cut to the same depth as the plowshares of the gang and is so positioned with respect to the furrow-wheel that the furrow through which it runs or cuts is traversed by the wheel.

Fixed to the front transverse beam 8 of the gang plow A, one near each end thereof, are angle brackets 9 and 10. To angle bracket 10 is pivotally connected one end of a beam 11. The beam 11, which is preferably integral, comprises a longitudinally extending portion 12 and a transverse portion 13, which portions are connected by a diagonally-extending portion 14. Pivoted at one end to the angle bracket 9 is a longitudinally-extending beam 15, which has its other end 16 turned diagonally to coincide with the diagonal portion 14 of the beam 11 to which it is rigidly connected. The beams 11 and 15 form a pivotally-mounted frame or carriage 17.

Secured to one side of the beam 15 near its point of connection with the beam 11 is a lug or bearing block 18 provided with a vertical aperture. Adapted to be slidably mounted in the aperture is a vertical shank or shaft 19 having suitably swiveled thereto a rearwardly and downwardly-curved fork 20 in which is suitably journaled a wheel 21. The shank 19 is adapted to be vertically adjusted in the perforation in the bearing block 18 to raise or lower the forward end of the frame 17, and is secured in its adjusted positions by means of a set-screw 22.

The end of the beam 1 is supported on top of the transverse portion 13 of the beam 11, and is held in position thereon by means of two studs or pins 23, 23, which are located one on each side of the end of the beam, as shown.

Connected to the front face of the transverse beam 8 of the plow A is a metal rod 24, which extends vertically upward for a portion of its length and is then bent at right angles and extended transversely to and above the beam 1 where it is bent back upon itself to form a hook 25. The hook 25 is designed to engage a vertical rod 26, which is connected in turn to the standard 6 of the auxiliary plowshare 7 and the beam 1. The rod 26 being embraced by or confined in the hook 25 prevents the plowshare from twisting and tends to maintain the same level and upright.

Secured to the beam 1 to one side of the vertical rod 26 is a hook 27. When it is desired to dispense with the use of the auxiliary or furrow plowshare 7, the same can be raised above the level of the ground over which the plow is operating by raising the beam 1 and securing the hook 27 over the transverse portion of the rod 24.

My improved attachment can be readily applied to gang plows now in use as well as manufactured as a part of the plow, and it will not in any way affect or interfere with the operation of the plow.

What I claim is:—

1. A plowing structure comprising a carriage, a plurality of plow shares mounted thereon, a pair of supporting wheels for said carriage, a frame pivotally connected to the front edge of said carriage, a supporting wheel adjustably connected to said frame, and a plow share connected to the side of said frame and in front of the furrow wheel of said carriage.

2. In a plow structure, a pivotally mounted beam, a plowshare carried by said beam, a pivotally mounted support, said beam resting on said pivotally mounted support, means for holding said beam in position on said support, and a wheel on which said pivotally mounted support is adjustably mounted.

3. In a plow structure, a movably mounted beam, a plowshare carried by said beam, a movably mounted support for said beam, a hook carried by said beam, and a support on which said hook can be secured.

4. In a plow structure, a movably mounted beam, a standard, a plowshare carried by said standard, a support for said beam, an upright secured to said standard and said beam, and a hook adapted to embrace said upright.

5. In a plow structure, a movably mounted beam, a plowshare carried by said beam, a support for said beam, an upright secured to said beam, and means for holding said upright in a substantially vertical position.

6. In a plow structure, a pivotally mounted longitudinally-extending plow beam, a plowshare carried by said plow beam, a longitudinally-extending frame comprising a pair of pivotally-mounted beams, one of said beams having a diagonally-extending portion to connect with the other beam of said frame, a transverse projection carried by said frame, means for holding the end of said plow beam on said transverse projection, movable means for supporting said frame, and means for adjusting said frame on said movable means.

In testimony whereof I hereunto affix my signature in presence of two witnesses.

MILTON S. STIMPSON.

Witnesses:
C. G. HAMM,
THEODORE DILL.